United States Patent [19]

Massa

[11] 4,066,095
[45] Jan. 3, 1978

[54] AUTOMATIC LEAKAGE DETECTION SYSTEM FOR PIPELINES CARRYING FLUIDS

[75] Inventor: Frank Massa, Cohasset, Mass.

[73] Assignees: Fred M. Dellorfano, Jr.; Donald P. Massa, both of Cohasset, Mass. ; trustees of The Stoneleigh Trust

[21] Appl. No.: 658,471

[22] Filed: Feb. 17, 1976

[51] Int. Cl.² .................... F16K 17/20; G01M 3/08
[52] U.S. Cl. .................... 137/486; 73/40.5 A; 137/460
[58] Field of Search ......... 73/40.5 R, 40.5 A, 29 HA; 137/459, 460, 486; 340/242, 239

[56] References Cited

U.S. PATENT DOCUMENTS

| 1,881,543 | 10/1932 | Hartig et al. | 73/40.5 A |
| 2,151,203 | 3/1939 | Hartig | 73/194 A |
| 3,695,094 | 10/1972 | Hulme | 340/242 |

FOREIGN PATENT DOCUMENTS

| 568,148 | 12/1958 | Canada | 137/460 |

*Primary Examiner*—Donald O. Woodiel

[57] ABSTRACT

A plurality of ultrasonic flow meter measurement probes are located at spaced intervals along the length of a pipeline carrying a fluid and each probe measures the rate of flow of the fluid at each location along the line. If a leak develops at any point along the pipeline the nearest probe located upstream from the leak will read higher than the measurement being made by the nearest downstream flow meter probe. The difference in readings between the adjacent probes will be an indication of the magnitude of the leak and when the difference exceeds a preset threshold limit an alarm will sound and a coded command signal will be transmitted from the data monitoring center to initiate the immediate closing of the nearest upstream and downstream shut-off valves in the vicinity of the leak. This procedure will immediately isolate the damaged section of the pipe and prevent uncontrolled leakage of the fluid into the environment. The location of the damage along the pipeline is instantly displayed on a central panel so that a service crew can be immediately dispatched to the exact location of the fault to make the necessary repairs.

4 Claims, 3 Drawing Figures

AUTOMATIC LEAKAGE DETECTION SYSTEM FOR PIPELINES CARRYING FLUIDS

This invention is concerned with the automatic detection and localization of a leak in a conduit while carrying a gaseous or liquid fluid. It is particularly useful in connection with the detection of leaks in pipelines which are not easily accessible to frequent visual inspection. Typical examples of application in which this invention is particularly useful is in underground pipelines transmitting natural gas or oil or in pipelines located in remote and not easily accessible places. The Alaska pipeline being constructed for use in transmitting crude oil through the hostile frozen terrain of the arctic region is an example of an application that could make good use of this invention.

The basic principle employed in this invention is to monitor the exact rate of fluid flow in a pipeline at a number of points along the length of the line and to continuously and automatically recognize any significant difference in the rate of flow between successive points and to give an instantaneous indication of any such differences at a central station. A suitable signal received at the central station will indicate the position along the pipeline at which the flow discrepancy is detected and appropriate action may be taken to immediately apply corrective procedures to prevent continuing spillage and to make the necessary repairs.

An important element required in my proposed leakage detection system is a highly reliable flow meter capable of making very accurate flow measurements so that any small difference in fluid flow between any two measurement points along the pipeline will be precisely indicated. Such a high accuracy flow meter can be achieved by making use of the ultrasonic flow meter system shown in FIG. 5 of my co-pending application Ser. No. 636,054 filed Nov. 28, 1975 in which a detailed description is given beginning with the paragraph starting on page 9 of the application.

The method for achieving the objects of this invention will become more evident in the disclosure which follows.

The primary object of this invention is to precisely measure the fluid flow at a plurality of points along a pipeline and to continuously indicate any differences in the rate of flow between points as a means for automatically detecting the presence of a leak at any location along the line at the instant that the leak occurs.

Another object of this invention is to automatically and continuously monitor the rate of flow along a pipeline carrying a fluid and to indicate the location and magnitude of a leak at the instant that it occurs.

A still further object of this invention is to automatically and continuously measure the rate of fluid flow at several points along a pipeline carrying a fluid and to instantly indicate any difference in flow between two points in the line and to signal the occurrence of any such difference by the transmission of an identifying signal to a central monitoring station to indicate the location along the line of the measured difference in flow.

Another object of this invention is to provide a monitoring system for detecting leakage along a pipeline carrying a fluid and to automatically indicate the presence of a leak at the instant it occurs and to also indicate the location along the line where leakage is occurring.

An additional object of this invention is to continuously monitor the rate of fluid flow at various points along the length of a pipeline and to recognize any significant difference in fluid flow being two points along the line when it occurs and to provide means responsive to the indication of any such recognized difference in flow to seal off the section of the pipe in the region where the flow difference is occurring to prevent spillage and permit necessary repairs to the damaged section causing the leak.

These and other objects of this invention will become more evident in the specifications which follow. The novel features which are characteristic of the invention are set forth with particularity in the appended claims. However, the invention itself, both as to its organization and method of operation, together with further objects and advantages thereof, will best be understood by reference to the following description when taken in conjunction with the accompanying drawings in which:

Referring more particularly to the figures in which one preferred form of the invention is illustrated, 1 illustrates a section of a conduit which is transporting a gaseous or liquid fluid with the flow direction indicated by the arrow. At each desired position along the conduit as illustrated by positions 201, 202, 203, is installed an ultrasonic flow meter probe assembly 201A, 202A, 203A. Each flow meter assembly includes a pair of ultrasonic transducers T1 and T2 facing each other and aligned with the axis of the conduit as illustrated in FIG. 1.

Figure 1:
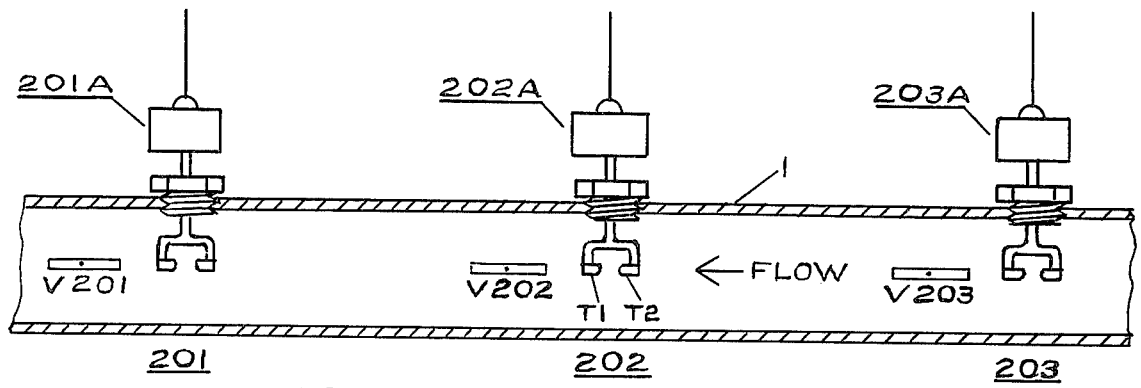
FIG. 1 is a schematic illustration of the installation of the novel ultrasonic leakage detection system in a section of conduit through which a fluid is being transported.

In my preferred embodiment illustrated in FIG. 1, a shut-off valve is advantageously placed in the conduit at the downstream side of each flow meter probe as illustrated by V201, V202, V203. Each of the shut-off valves may be equipped with an electrically actuated control mechanism of any well known type, not shown in the sketch, which may be operated by a command signal which is automatically transmitted from a control center to close a particular valve on command whenever a leak is detected in the downstream vicinity of the valve.

Figure 2:
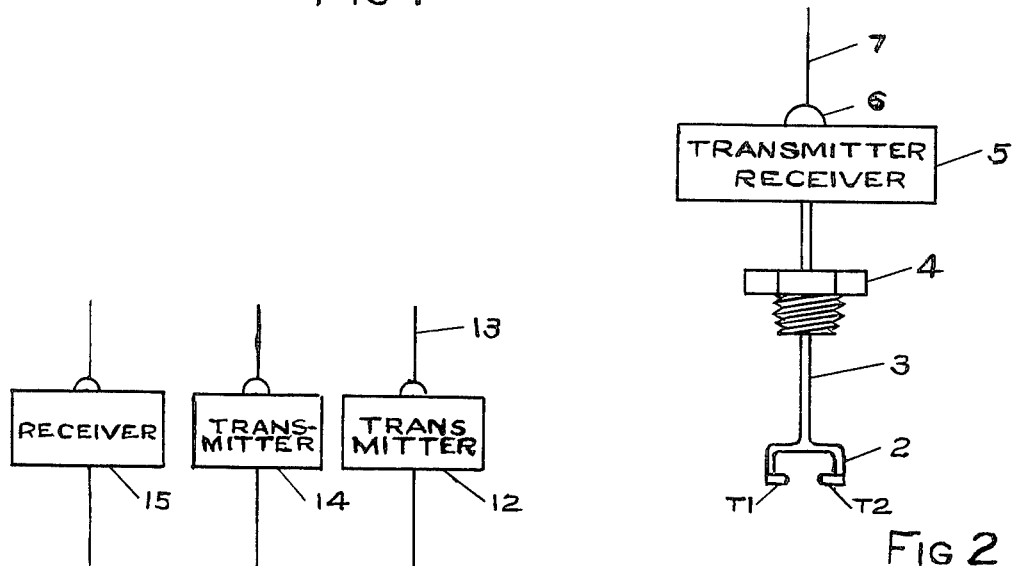
FIG. 2 is an enlarged diagramatic view of one of the precision ultrasonic flow meter measurement probes, including the associated electronic package for operating the probe and for transmitting the measured data to a central station.

An enlarged schematic view of the ultrasonic flow meter probe is shown in FIG. 2. Two small ultrasonic transducers T1 and T2 are mounted facing each other and sealed to opposite ends of a tubular fixture 2 which is in turn sealed to the lower end of a tubular stem 3 as shown. The stem 3 passes through and is sealed to a pipe plug 4 which serves to attach and seal the probe assembly to the conduit 1 which is provided with a mating tapped hole at each location 201, 202, 203, as illustrated in FIG. 1. The upper end of the tubular stem 3 is secured and sealed to a housing structure 5 which contains the electronic circuit for operating the ultrasonic flow meter measurement probe and for coding and continuously transmitting the measured data to a central terminal. At the top of the housing structure 5 is shown an insulator 6 which supports the antenna 7 for transmitting the data by radio link. The radio link is one of several well known data transmission systems that may be used. Alternately the data may be transmitted over the power line that furnishes the power to operate the flow meter assemblies along the pipeline, which is another well known method for transmitting electrical data and does not form a part of this invention.

The details of the electronic circuit assembled in housing 5 for operating the transducers T1 and T2 are also not shown as they are well known in the art and do not form part of this invention. A more complete description of the operation of the ultrasonic flow meter probe illustrated in FIG. 2 can be found in my co-pending application. The transducers T1 and T2 are connected by wires, not shown, which pass through the hollow tubular members 2 and 3 and into the housing 5 which contains the electronic circuit. The entire assembly is thus hermetically sealed to operate reliably in all hostile environments that may be encountered.

The principle of operation of the ultrasonic transducers mounted in the probe for making precise flow measurements is fully described in my co-pending application. It consists basically in measuring the difference in transmission time for a pulse of ultrasonic energy to travel the distance from T1 to T2 compared to the time in travelling from T2 to T1. When the sound pulse is travelling downstream it will arrive sooner than when travelling upstream if the fluid is moving and the difference in arrival times is a measure of the flow velocity. The precise measurement of the transit time for the ultrasonic signals to travel between T1 and T2 is accomplished by switching an electrical signal to activate one transducer which generates the ultrasonic signal. At the same instant of activating the transducer, the switching signal also starts an electronic clock which may employ a quartz crystal oscillator, for example, as is well known in the art, as the reference frequency standard to permit the measurement of time to the required accuracy which, for this application, is generally in the order of a fraction of a microsecond. At the instant of arrival of the ultrasonic signal to the receiving transducer the electronic clock is stopped and the time period required for the ultrasonic signal to travel from the transmitting transducer to the receiving transducer is thereby precisely indicated. The procedure is then reversed so that the receiving transducer becomes the transmitter and the transmitting transducer becomes the receiver. The time measurement made for the reversed direction of transmission then indicates the precise time period for the ultrasonic signal to travel in the opposite direction in the conduit. The difference between the two time measurements will represent the exact rate of flow at the particular location of the probe. This time difference is continuously measured at each station along the pipeline and is continuously transmitted to the central station where it is automatically displayed on the appropriate LED 10 which represents the corresponding probe which is transmitting the data.

Neither the ultrasonic flow meter nor the details of the electronic circuits for operating the system form any part of this invention, as they are well known in the prior art; therefore, any additional description of these components in the system will be omitted from this disclosure in order to simplify the description of the invention which is directed only to the new combination of these well known elements to provide a new system, as described, for automatically detecting and locating a leak in a pipeline carrying a fluid whenever a leak occurs.

Each electronic circuit associated with each of the flow meter probes 201A, 202A, 203A contains a microprocessor or other well known circuit means for continuously processing the measurements at each probe location and adding the necessary coding information to identify the particular probe position along the pipeline during the transmission of the data to the central terminal. None of the details of the electronic processing circuits is shown because they are well known in the electronic and computer art and they do not form part of this invention.

Figure 3:
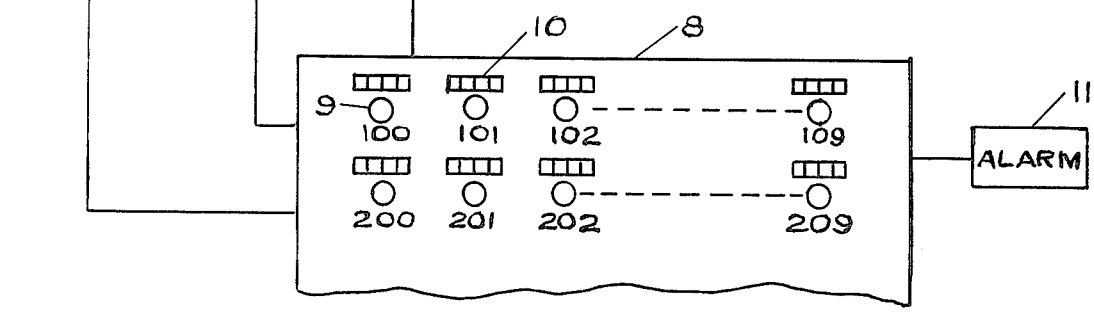
FIG. 3 is a schematic view of the central station indicator panel for instantly displaying the magnitude and the location of any leak along the pipeline. Also illustrated is a schematic block diagram for transmitting a coded signal to remotely shut off the upstream valve next to the ultrasonic probe at the instant that the probe indicates the occurrence of a leak exceeding an acceptable limit.

FIG. 3 is a schematic illustration of a central terminal that continuously receives and displays the measured flow data for each station along the pipeline where the ultrasonic flow measurement probes are located. For the purposes of presenting a visual display of the fluid flow rates at the different points along the line, a display board 8 is illustrated which contains a number of pilot lights 9, one for each position of a flow meter location along the pipeline. Each pilot light is identified by its location number 100, 101, 102 as shown below each light in FIG. 3. Above each pilot light is a LED digital display 10 that shows the actual fluid flow velocity as it is being continuously measured at the locations of each ultrasonic measurement probe along the line. If the cross-sectional area of the pipe is uniform at each probe location and if there are no leaks along the line, the fluid velocity will be uniform throughout the length of the line and the LED's will all read the same. Some minor differences in readings may appear due to tolerances in the area of the conduit at the points of measurement and also due to any difference in temperature along the conduit if the temperature difference is sufficiently large to cause a significant change in the density of the fluid and thereby cause corresponding differences in the flow readings. These variations are generally very small, however, especially between adjacent measurement stations, and thus may generally be neglected.

If a leak develops at any point along the pipeline the nearest ultrasonic flow meter probe located upstream from the lead will read higher than the measurement being made from the nearest downstream flow meter probe. The difference in readings between the adjacent probes will then be an indication of the magnitude of the leak. When the difference in readings becomes greater than a preset threshold (which is set to take care of all the tolerances in the system) the pilot light associated with the lower reading flow meter will light up on the display board. At either the same or at a higher threshold limit, which is set to represent an unacceptable leakage situation, an alarm 11 will be activated and the radio transmitter 12 will be energized to transmit a coded command signal from the radio antenna 13 (or the signal can be sent directly over the power cable as an alternate possibility if desired) to initiate the closing of the nearest upstream and downstream valves in the vicinity of the indicated leak. The possibility of instantly and automatically closing the valves will immediately isolate the damaged section of the pipe and prevent uncontrolled leakage of the fluid.

Another radio transmitter 14 contains the necessary circuits, which are also well known in the art, for sequentially sending a different coded signal to successively interrogate each flow measurement station along the pipeline in rapid sequence and commanding each probe to transmit the flow rate data as it is being measured at the instant of interrogation. The data thus continually transmitted by the measurement stations along the pipeline during each interrogation cycle of the transmitter 14 is continuously received by the radio receiver 15 and the flow information is continuously used to update the LED 10 associated with each ultrasonic probe location along the pipeline.

Although the transmitters and receivers have been illustrated in the block diagram as separate units, it is obvious to anyone skilled in the art that the different circuits can be assembled within a common structural unit if desired. It is also obvious that different data may be transmitted and received on a common channel by multiplexing if desired as is also well known in the art.

While I have shown and described a specific embodiment of the present invention, it should be understood that various modifications and alternative constructions may be made without departing from the true spirit and scope of the invention. Therefore, it is intended by the appended claims to cover all equivalent and alternative constructions which might fall within their true spirit and scope.

I claim:

1. In combination in a system for monitoring the rate of flow of a fluid being transported through a conduit, a plurality of valve means located at various points along the conduit for controlling the rate of flow of said transported fluid, a plurality of flow measurement probes located at different points along the conduit, the locations of said plurality of flow measurement probes characterized in that neighboring pairs of probes are located one upstream and one downstream from a particular valve means, each probe characterized in that it produces an output signal which is precisely indicative of the rate of flow in the conduit at the position in the conduit occupied by the probe, means for comparing the output signal from one probe with the output signal from another probe, remote control means for selectively operating said valve means, said remote control means characterized in that it is selectively responsive to any specified difference in said output signals being produced by a neighboring pair of probes, said remote control means further characterized in that a particular valve means is operated by a particular remote control signal initiated in response to said specified difference in output signals produced by a particular pair of probes, said remote control means further characterized in that it selectively initiates the closing of a pair of valve means located one upstream and one downstream from the probe which has indicated an abrupt decrease in flow from its nearest upstream neighbor, whereby the section of the conduit containing said probe is isolated and sealed off by the closing of the said pair of valve means.

2. The invention in claim 1 and signal transmission means associated with each probe for transmitting its output signal to a central location.

3. The invention in claim 2 and a display panel, said display panel including means for the visual indication of the rates of fluid flow at the different positions of the probes along the conduit.

4. The invention in claim 3 and signal coding means associated with each probe for identifying the individual probe location associated with each received signal during the transmission of signal information from a plurality of probes.

* * * * *